United States Patent
Dickinson et al.

(10) Patent No.: US 9,246,363 B2
(45) Date of Patent: Jan. 26, 2016

(54) REDUCING STRESS IN ELECTRIC-MACHINE ROTORS BY OPTIMIZING HOLES

(75) Inventors: Phillip George Dickinson, Harrogate (GB); Paul Andrew Sykes, Otley (GB); Norman Neilson Fulton, Harrogate (GB); Thilak Raj Durairaj, Harrogate (GB)

(73) Assignee: NIDEC SR DRIVES, LTD, Harrogate (GB)

( * ) Notice: Subject to any disclaimer, the term of this patent is extended or adjusted under 35 U.S.C. 154(b) by 668 days.

(21) Appl. No.: 13/105,670

(22) Filed: May 11, 2011

(65) Prior Publication Data

US 2011/0285242 A1    Nov. 24, 2011

(30) Foreign Application Priority Data

May 20, 2010 (GB) .................................. 1008458.0

(51) Int. Cl.
*H02K 1/24* (2006.01)
(52) U.S. Cl.
CPC . *H02K 1/246* (2013.01); *H02K 1/24* (2013.01)
(58) Field of Classification Search
CPC ........... H02K 1/246; H02K 1/24; H02K 1/22; H02K 1/08; H02K 15/022; H02K 15/02; H02K 19/103; H02K 7/025; H02K 7/09; G06F 17/5095; G06F 17/5086; F16C 15/00; Y02E 60/16
USPC ............................................ 310/216.075, 74
See application file for complete search history.

(56) References Cited

U.S. PATENT DOCUMENTS

| | | | | |
|---|---|---|---|---|
| 713,604 A * | 11/1902 | Churchward | .......... | 310/216.077 |
| 737,576 A * | 9/1903 | Burrow | ................... | 310/216.077 |
| 919,458 A * | 4/1909 | Poth | ....................... | 310/216.077 |
| 2,338,525 A * | 1/1944 | Mason | .......................... | 310/162 |
| 3,956,678 A | 5/1976 | Byrne et al. | | |
| 4,691,133 A * | 9/1987 | Mongeau | ................. | H02K 3/24 310/114 |
| 4,698,537 A * | 10/1987 | Byrne et al. | ................... | 310/168 |
| 4,743,825 A * | 5/1988 | Nashiki | ......................... | 318/723 |
| 4,788,465 A * | 11/1988 | Hertrich | ....................... | 310/269 |
| 5,250,867 A * | 10/1993 | Gizaw | ........................... | 310/179 |
| 5,258,679 A * | 11/1993 | Gassmann | .................... | 310/194 |
| 5,559,386 A * | 9/1996 | Gurrieri | ................. | H02K 19/14 310/162 |
| 5,747,912 A * | 5/1998 | Sakuma et al. | ........ | 310/216.075 |
| 6,002,190 A | 12/1999 | Kieffer | | |

(Continued)

FOREIGN PATENT DOCUMENTS

| | | |
|---|---|---|
| EP | 0 416 468 A1 | 3/1991 |
| EP | 1 990 895 A2 | 11/2008 |

(Continued)

OTHER PUBLICATIONS

FR 2984034 A1 Machine Translation.*

(Continued)

*Primary Examiner* — John K Kim
(74) *Attorney, Agent, or Firm* — Haynes and Boone, LLP

(57) ABSTRACT

A rotating electrical machine has a rotor composed of laminations having salient poles. The poles have one or more holes which are positioned so as to reduce the peak stress experienced by the laminations when the rotor is rotating. The holes are chosen according to a disclosed design procedure which gives a reduction in peak stress for a given limit on the output of the machine.

21 Claims, 8 Drawing Sheets

(56) References Cited

U.S. PATENT DOCUMENTS

| | | | |
|---|---|---|---|
| 6,091,168 | A * | 7/2000 | Halsey ..................... H02K 1/24 310/166 |
| 6,208,054 | B1 * | 3/2001 | Tajima et al. ............ 310/156.53 |
| 6,236,132 | B1 * | 5/2001 | Saito et al. ............. 310/216.097 |
| 6,441,529 | B1 * | 8/2002 | Mimura et al. ......... 310/216.074 |
| 6,483,212 | B1 * | 11/2002 | Mimura et al. ............. 310/68 R |
| 6,794,784 | B2 | 9/2004 | Takahashi et al. |
| 7,420,308 | B2 * | 9/2008 | Ramu .................. H02K 19/103 310/172 |
| 7,560,842 | B2 | 7/2009 | Hattori |
| 7,598,645 | B2 * | 10/2009 | Ley et al. ................ 310/156.38 |
| 7,863,793 | B2 * | 1/2011 | Nishijima ................ 310/156.57 |
| 7,932,658 | B2 * | 4/2011 | Ionel ....................... 310/156.52 |
| 8,006,789 | B2 * | 8/2011 | Dial ........................ B60L 11/00 180/65.1 |
| 8,102,091 | B2 * | 1/2012 | Ionel ....................... 310/156.53 |
| 2005/0156475 | A1 * | 7/2005 | Ramu .................. H02K 19/103 310/166 |
| 2008/0224558 | A1 * | 9/2008 | Ionel ....................... 310/156.57 |
| 2008/0247515 | A1 | 10/2008 | Probst et al. |
| 2008/0278021 | A1 * | 11/2008 | Ley et al. ................ 310/156.38 |
| 2009/0102306 | A1 * | 4/2009 | Nishijima ................ 310/156.53 |
| 2010/0026128 | A1 * | 2/2010 | Ionel ....................... 310/156.53 |
| 2010/0213786 | A1 * | 8/2010 | Holtzapple et al. .... 310/216.075 |
| 2011/0048821 | A1 * | 3/2011 | Dial ........................ B60L 11/00 180/65.1 |
| 2011/0285242 | A1 * | 11/2011 | Dickinson .............. H02K 1/246 310/216.055 |
| 2013/0207498 | A1 * | 8/2013 | Kusase et al. ............ 310/156.01 |

FOREIGN PATENT DOCUMENTS

| | | | | |
|---|---|---|---|---|
| EP | 2 020 732 | A1 | 2/2009 | |
| FR | 2984034 | A1 * | 1/2013 | ............... H02K 3/52 |
| FR | 20884034 | A1 * | 1/2013 | ............... H02K 3/52 |
| JP | 54-134304 | U * | 10/1979 | ............... H02K 1/28 |
| JP | 10210721 | | 8/1998 | |
| JP | 2001359262 | A * | 12/2001 | ............. H02K 19/10 |
| JP | 2002064949 | A * | 2/2002 | ............... H02K 1/14 |
| JP | 2007-104888 | | 4/2007 | |
| JP | 2008-187867 | | 8/2008 | |

OTHER PUBLICATIONS

D.A. Staton et al., Optimisation of the Synchronous Reluctance Motor Geometry, IEE Conf. Elec. Machs. & Drives, Sep. 1991, pp. 156-160.*

Y. Honda et al., Rotor Design Optimisation of a Multi-Layer Interior Permanent-Magnet Synchronous Motor, Mar. 1998, IEE Proc.-Elec. Power Appl., vol. 145, No. 2, pp. 119-124.*

JP 2001-359262 A Machine Translation.*

JP 2002-064949 A Machine Translation.*

M. Sanada et. al., Radial Force and Acoustic Noise Reduction for Switched Reluctance Motor with Hole inside Pole, 2003, IEEJ Trans. IA, vol. 123, pp. 1438-1445.*

K. Nakata et al., Noise Reduction for Switched Reluctance Mortor (sic) with a Hole, 2002, Proceedings of Power Conversion Conference—Osaka, IEEE, pp. 971-976.*

PTO 14-5938 Translation of M. Sanada et al., Radial Force and Acoustic Noise Reduction for Switched Reluctance Motor with Hole Inside Pole.*

K.Vijaykumar, A New Method for Reducing Magnetic Radial Force in Switched Reluctance Motor, in Proceedings of International Conference on Energy Engineering, 2009.*

Machine translation of JP 2008-187867A.*

TJE Miller, Electronic Control of Switched Reluctance Machines, Newnes Power Engineering Series, pp. 92-97, 2001.

Stephenson and Blake, The Characteristics, Design and Applications of Switched Reluctance Motors and Drives, PCIM '93, pp. 1-68, Nürnberg, Jun. 21-24, 1993.

K.Y. Lu et al., A New Low-Cost Hybrid Switched Reluctance Motor for Adjustable Speed Pump Applications, Proceedings of 41$^{st}$ Annual Meeting of the Industrial Applications Society, Tampa, Florida, pp. 1-6, Oct. 8-12, 2006.

M. Sanada et al., Novel Rotor Pole Design of Switched Reluctance Motors to Reduce the Acoustic Noise, Thirty-Fifth Annual Meeting and World Conference on Industrial Applications of Electrical Energy, pp. 107-113, Oct. 8-12, 2000, Rome Italy, vol. 1.

* cited by examiner

REDUCING STRESS IN ELECTRIC-MACHINE ROTORS BY OPTIMIZING HOLES

CROSS-REFERENCE TO RELATED APPLICATIONS

This patent application claims priority to and the benefit of Great Britain Patent Application No. GB 1008458.0 filed May 20, 2010, which is incorporated herein by reference in its entirety.

TECHNICAL FIELD

The present invention generally relates to the design of rotor laminations for an electrical machine. It is particularly beneficial for laminations with a relatively small number of salient poles, as commonly used on reluctance machines and some permanent magnet machines.

BACKGROUND

Electrical machines in general are constructed from laminations of electrical sheet steel, the resulting structure being used to carry the magnetic flux on which the machine depends for its operation. The structure is laminated to reduce the effect of eddy currents, which flow in the steel due to the time rate of change of the flux. Usually only machines with unvarying flux have unlaminated structures. For example, the field structure of a dc machine can be unlaminated (i.e. made of solid metal), though even in these machines a laminated structure is often adopted in order to reduce the transient response when the machine is subjected to a new operating condition. The degree of lamination is usually based on the frequency of flux variation in the machine. For example, in a machine energised directly from the 50 or 60 Hz mains supply and operating at, say, 1500 or 1800 rev/min, a lamination thickness of 0.50 or 0.65 mm is often adopted. For a machine operating on a 400 Hz supply and running at 12000 rev/min, a lamination thickness of 0.20 mm might be selected.

The laminations are stacked to provide a pack or core of the desired length. Stationary laminations form the stator core and are typically inserted in a frame or provided with some other structure to secure it against the torque reaction experienced during operation. Moving laminations form the rotor core and are typically mounted on a shaft which is housed in a bearing system.

One example of an electrical machine which uses this arrangement is the switched reluctance machine. A general treatment of electrical drives which incorporate switched reluctance machines can be found in various textbooks, e.g. "Electronic Control of Switched Reluctance Machines" by T J E Miller, Newnes, 2001, incorporated herein by reference. More detail is provided in the paper "The characteristics, design and application of switched reluctance motors and drives" by Stephenson and Blake, PCIM'93, Nürnberg, 21-24 Jun. 1993, incorporated herein by reference.

FIG. 1 shows typical rotor and stator laminations for a switched reluctance machine. Both laminations have salient poles and some or all of the stator poles carry coils which are interconnected to form one or more phase windings. In the example shown, the rotor lamination 16 has four poles 14, the stator lamination 10 has six poles 11 with six coils 13 connected in opposite pairs to form three phase windings, A, B & C. The rotor laminations are mounted on a shaft 18. As is well known in the art, the number of stator and rotor poles, the number of coils and the number of phase windings can vary widely and are selected by the designer to suit the criteria of the design in hand.

The salient poles of the rotor lamination extend radially outward from a core portion of the rotor lamination. The core portion comprises a cut-out for accommodating the shaft 18. A root portion of the salient pole is adjacent to the core portion. An outer contour or profile of the lamination defines: a fillet radius at the root portion, smoothly joining the salient pole to the core portion; a pole face at a radially outer aspect of the salient pole; and, typically, straight sides between the pole face and the fillet radii on each side of the salient pole. Typically, a centre line of the salient pole coincides with a radius through the axis of rotation.

Typically, the rotor does not carry any windings, so the rotor assembly is generally much more robust than for other types of machine which have windings or magnets mounted on the rotor. While this characteristic enables operation of the rotor at higher speeds than would normally be contemplated by designers, there are applications which still demand ever higher speeds, e.g., drives for flywheels, turbines and material testing equipment.

The limit on the useful speed of the rotor of a switched reluctance motor is typically the stress induced in the lamination by the centrifugal forces. While the elastic stress limit of lamination steel varies a little from one grade of steel to another, a typical yield stress is in the region of 350 MPa, so the designer would probably design for a peak of around 280 MPa to allow a suitable safety margin.

FIG. 2 shows the results of a stress analysis for a rotor lamination having 8 rotor poles. This analysis is performed by setting up a finite element model of a sector of the lamination and solving for the centrifugal stresses. This particular lamination has an inside (shaft) diameter of 145 mm and a mass of 376 kg per meter of stack length. Stress contours at 10,000 rev/min are shown in FIG. 2 in MPa (e.g., contours along which the stress at 10,000 rev/min is approximately equal to 45 MPa, 90 MPa, 135 MPa, and 180 MPa). The analysis shows that the highest stress region is around the shaft with a stress of around 180 MPa. This would indicate that the material is not being used to its full capabilities and that the rotor mass could be reduced.

One known method of achieving these objects is to increase the shaft diameter and make it hollow. FIG. 3 shows the lamination of FIG. 2 modified in this way, with the shaft diameter increased from 145 mm to 197 mm. This reduces the mass of the lamination and, although using a solid shaft would simply maintain the overall mass at around the same level, the use of a hollow shaft yields a net reduction in the mass of the assembly. FIG. 3 shows that the shaft diameter has been increased to such a degree that the peak stress in the rotor lamination at 10,000 rev/min is now at its maximum design level, i.e., around 270 MPa (see, e.g., the stress contours in FIG. 3 along which the stress at 10,000 rev/min is approximately equal to 45 MPa, 90 MPa, 135 MPa, 180 MPa, 225 MPa, and 270 MPa). The limiting areas are two regions at the root of the pole. According to the known method, this represents the maximum shaft diameter that can be used.

Further increases of the shaft diameter, while reducing the mass of the laminations, would bring unacceptable increases in peak stress at the pole root, as shown in FIG. 4, where the shaft diameter has been increased to 210 mm. In FIG. 4, the values of the contour lines in the pole body are as in FIG. 3, but the stress at the root of the poles is now above 300 MPa at 10,000 rev/min, which is not acceptable for a safe design (see, e.g., the stress contours in FIG. 4 along which the stress at 10,000 rev/min is approximately equal to 225 MPa, 270 MPa, and 315 MPa).

U.S. Pat. No. 3,956,678 discloses an electrical machine having salient poles with holes near the pole face to provide a non-symmetric saturation-dependent flux pattern. A hybrid switched reluctance and permanent magnet motor having a circumferential, slot-shaped hole near the pole face for the same purpose is disclosed in "A new Low-Cost Hybrid Switched Reluctance Motor for Adjustable Speed Pump Applications", K. Y. Lu et al, Proceedings of 41st Annual Meeting of the Industrial Applications Society, Tampa, Fla., 08-12 Oct. 2006. In their position close to the pole face, these holes do not affect the peak stress in or near the root portion of the salient pole.

A switched reluctance motor having a rectangular window near the root portion of a salient rotor pole for the purpose of acoustic noise reduction is disclosed in "Novel Rotor Pole Design of Switched Reluctance Motors to Reduce the Acoustic Noise", M. Sanada et al, IAS2000, Thirty-fifth Annual Meeting and World Conference on Industrial Applications of Electrical Energy, 08-12 Oct. 2000, Rome, Italy, Vol 1, pp 107-113. The sharp corners of the rectangular hole in the peak stress region near or at the root portion of the pole act to increase, rather than to decrease, peak stress in the rotor.

There is therefore a need for a design for a salient pole rotor lamination which keeps within the design peak stress level for the lamination, while substantially maintaining the quality of the electromagnetic performance of the machine.

SUMMARY

In a first aspect of the invention there is provided a rotor for a rotating electrical machine. The rotor has an outer profile defining a plurality of salient poles projecting outwardly from a core portion. The core portion defines an axis of rotation for the rotor. Each pole has a hole defined by a closed contour. The hole is arranged so as to reduce peak stress in the rotor when the rotor is rotating about the axis.

Counterintuitively, the inventors have realised that the peak or maximum stress in a rotor for a rotating electrical machine can be reduced by removing material from the rotor poles. It is believed that this renders the rotor less stiff thereby reducing the peak (or maximum) stress experienced by the rotor material for a given rate of rotation, so that otherwise identical rotors can be driven at a higher rate of rotation or a different, less strong material can be used. For the avoidance of doubt, the reduction in peak stress is assessed by a comparison against an otherwise identical rotor experiencing the forces corresponding to a notional rate of rotation. For example, this can be evaluated using a finite element analysis, calculating the stresses in the rotor (with and without hole or holes) due to forces corresponding to a notional rate of rotation, for example 10,000 revolutions per minute (rev/min).

The closed contour defining the hole may have a generally triangular shape and may have rounded corners joining the three sides of the closed contour. The closed contour may have a base across its respective pole and two sides extending outwardly from the base towards each other. The base and the two sides may be joined by rounded portions of the contour. Alternatively, the closed contour may be substantially circular.

The closed contour may be smooth to avoid introducing new regions of peak stresses which would be generated if the contour had any sharp corners, as would be the case, for example, for a rectangular contour. In other words, the rate of change of the tangential direction of the contour along the contour is (in the ideal case) finite and, in practice, smaller than that of a rectangular contour manufactured in a rotor lamination.

Preferably, each pole and respective hole are centred on a respective radius through the axis of rotation for the rotor.

The rotor may be formed from a stack of laminations. The rotor preferably has a single hole in each pole to provide the peak stress relief but, alternatively, may have one or more further holes in each pole to provide peak stress relief.

In a second aspect of the invention, there is provided a rotor lamination for stacking to make a rotor as described above.

In a third aspect of the invention, there is provided an electrical machine which comprises a stator and a rotor as described above arranged to rotate within the stator.

Preferably, the hole or holes are being arranged such that a reduction in the measure of torque output of the machine due to an absence of magnetisable material within the closed contour or contours does not exceed 10%, preferably 5%, of the torque output without the hole or holes. In some cases a 20% reduction may be acceptable.

Again, the measure of torque reduction can be evaluated using a finite element analysis as described in detail below. The measure may be a measure of the static torque output of the machine, for example the average static torque, that is the static torque in response to a given excitation current evaluated at a plurality of points over, for example, half of the electrical pole pitch angle and then averaged. The torque is evaluated at a defined excitation current, preferably one which drives the flux levels in the machine to the maximum levels experienced in its application. A particular excitation current which can be used is 1000 A.

The machine may be a switched reluctance machine.

In a fourth aspect of the invention, there is provided a method for manufacturing a rotor or laminations for stacking into a rotor. The rotor has an outer profile defining a plurality of salient poles projecting outwardly from a core portion defining an axis of rotation. The method includes making one or more holes in each pole, thereby reducing peak stress in the rotor when the rotor is rotating about the axis.

Peak stress may, for example, be evaluated as described above. The method may include preparing a design for the rotor or lamination. This may include varying the radial position and size of a hole to reduce peak stress subject to a minimum requirement on a measure of machine output, such as average static torque. The preparation of the design may additionally include varying the shape of the hole.

For example, a design method using a circular hole may include increasing a distance of a centre of a hole of given diameter from the axis of rotation until a local minimum of peak stress is found, increasing the hole diameter and repeating these steps as long as the measure of machine output is larger than a threshold value, for example a fraction of the machine output without the hole.

Another design approach includes increasing the distance of the centre of a circular hole of given diameter from the axis of rotation to find a local minimum of peak stress and then increasing the diameter of the hole while adjusting the position so that the radial innermost point on the hole contour remains in a substantially fixed position to further minimise peak stress until a measure of torque output, such as a fraction of the torque output of the machine without holes, falls to a minimum acceptable value.

Another design process may include designing a non-circular hole (NCH) to reduce peak stress. The approach may include determining key points on the boundary of the hole. A point R is established by moving a hole, say having a diameter of between 50 to 75% of the pole width, outwards from the centre of the rotor until a local minimum of peak stress is found. Point R is then taken as the innermost point of the NCH. The circular hole is then moved further out until the torque output begins to fall below a minimum requirement, taking a point S as the outer most point of the circular hole in that position. Then, a series of concentric circles is constructed on a point on the centre line of the pole at the root of the pole and the diameter which corresponds to a reduction in the measure of torque output to an acceptable limit is determined. The intersection of that circle with a line at the root of the pole determines a locus of minimum width from the outer contour of the pole to be left by the NCH. The line at the root of the pole may, for example, be located a point where straight sides of the pole transition to a fillet radius joining the pole to the core portion.

This design procedure provides inner, outer and lateral boundaries for the non-circular hole, which can be formed in a variety of shapes within these boundaries. However, sharp internal corners should be avoided to avoid introducing new peak stresses and for ease of manufacture. The radial length of the remaining part of the pole which is of a minimum width as described above should be kept relatively short so as to minimise the increase in magneto motive force (mmf) required to support the flux in the lamination. A suitable shape is therefore a generally triangular hole having rounded corners and a base across the pole (for example perpendicular to the central radius of the pole) and located within the confines described above.

The invention is not limited to laminated materials, since it can be applied with corresponding benefit to unlaminated rotors which are constructed from, e.g., solid material machined to a final shape or soft magnetic compound (SMC), which is moulded and sintered to produce a final part.

BRIEF DESCRIPTION OF THE DRAWINGS

Other aspects and advantages of the apparatus and methods disclosed herein will become apparent upon reading the following detailed description of examples of rotor laminations with reference to the accompanying drawings, in which.

DETAILED DESCRIPTION

Figure 3:
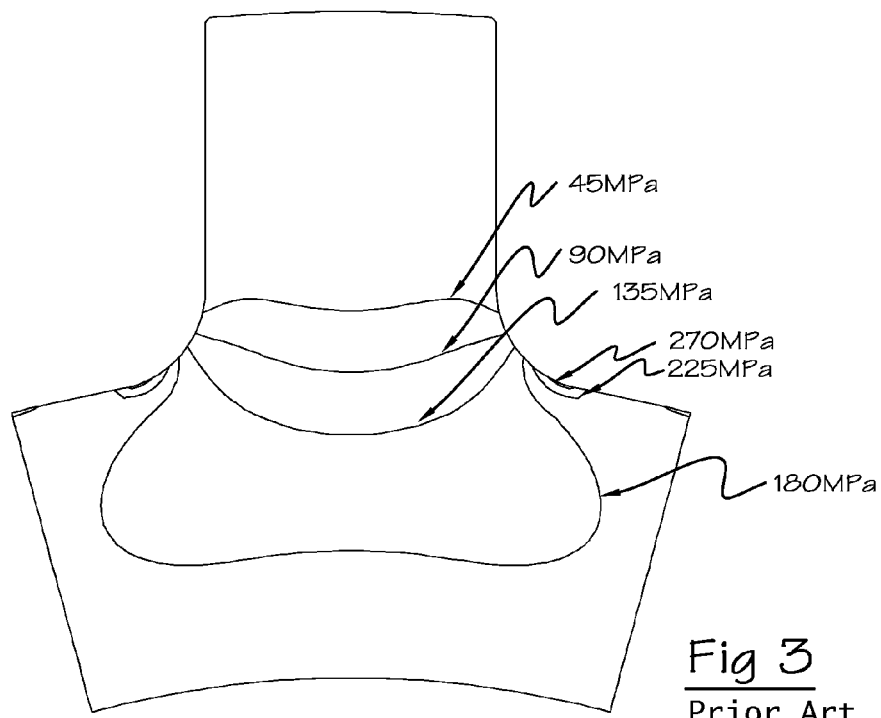
FIG. 3 shows the results of a stress analysis for a modified rotor lamination with increased shaft diameter, the numeric values indicating stress contours in MPa at 10,000 rev/min.
Figure 4:
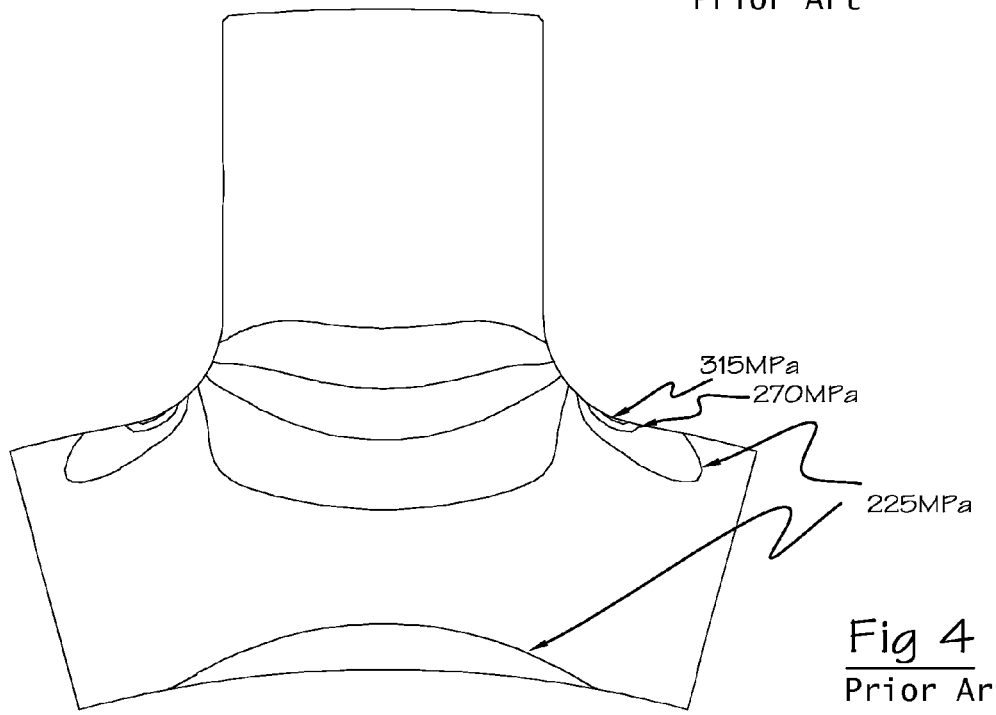
FIG. 4 shows the results of a stress analysis for a rotor lamination with a further increase in shaft diameter, the numeric values indicating stress contours in MPa at 10,000 rev/min.
Figure 5:
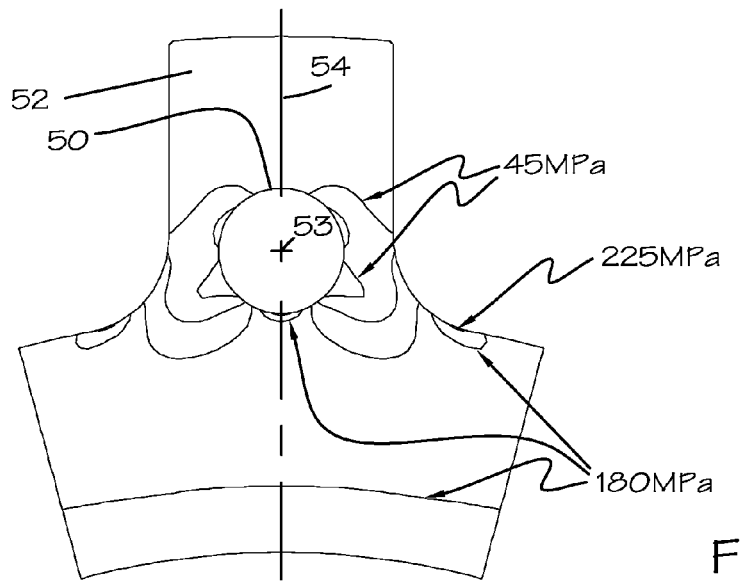
FIG. 5 shows a sector of a rotor lamination with a hole in a salient pole according to one embodiment together with the results of a stress analysis for the rotor lamination, the numeric values indicating stress contours in MPa at 10,000 rev/min.

FIG. 5 shows a sector of a rotor lamination according to an embodiment. The main dimensions of the lamination are the same as those of the lamination of FIG. 3, where the pole width is 28.6 mm. A circular hole 50 has been introduced to the rotor pole 52. The centre 53 of the hole is placed on the centre-line 54 of the pole and, in this example, the hole has a diameter of 16 mm. Other sizes of circles or geometrical shapes could be used to form the hole, as will be discussed below.

Although it could be expected that reducing the cross section of material near the root of the pole would have the effect of increasing the stress in the lamination for a given operating condition, the stress contours in FIG. 5 (see, e.g., the contours in FIG. 5 along which the stress at 10,000 rev/min is approximately equal to 45 MPa, 180 MPa, and 225 MPa) show that this is not so. Examination of the stress values show that the peak stress has actually reduced by about 17%. This is counter intuitive, but is believed to result from the reduced stiffness of the pole, which in turn reduces the stress.

Figure 6:
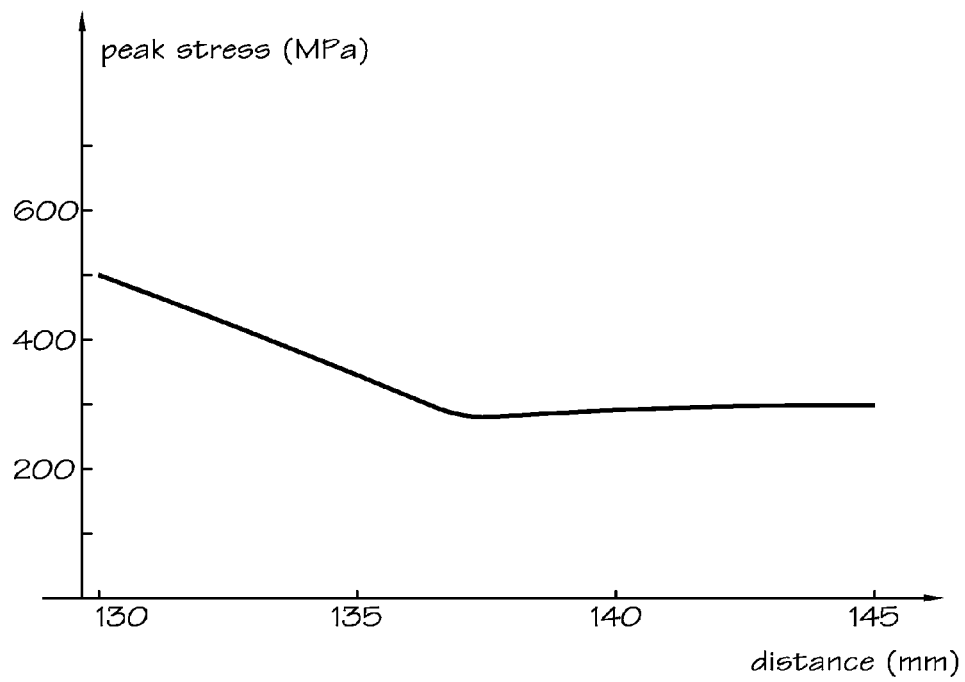
FIG. 6 shows a curve of peak stress as a function of the radial distance from the axis of rotation of the hole in the lamination, which represents the results of a stress analysis for the rotor lamination of FIG. 5.

The radial distance from the centre of the lamination to the centre of the hole can be varied under the control of the lamination designer and this position has an effect on the peak stress levels. FIG. 6 shows a graph of peak stress against the distance of the centre of the hole from the lamination centre. In this example, the hole diameter is again 16 mm. It is seen that as the hole position moves away from the lamination centre the stress falls almost linearly to a minimum value then rises only slowly thereafter. This offers the designer the possibility of choosing the position of the hole to minimise the stress level in the lamination. In this case, a distance of around 138 mm would be appropriate to give the benefit of the lowest peak stress.

It is apparent that by introducing a hole to the rotor lamination, the peak stress can be reduced or the operating speed could be increased until the peak stress reaches the safe limit. Alternatively, the bore diameter of the lamination could be increased without exceeding the previous peak stress and the benefit could be taken as reduced mass in the rotor.

A further benefit is now apparent from this embodiment. As well as reducing the peak stress, the removal of material from the lamination not only reduces the mass of the rotor but, because the removal is at a significant distance from the centre of the rotor, the inertia of the rotor is greatly reduced. This inertia reduction enhances the transient performance of the machine, and is a benefit which is not gained by placing material removal holes in the core portion of the rotor. Analysis of the exemplary lamination shown in FIG. 5 indicates that the inertia of the rotor is reduced by almost 10% of the inertia of the lamination in FIG. 3.

A further factor to consider is the diameter of the hole. For each of a range of hole diameters, a curve corresponding to that shown in FIG. 6 is constructed and displayed in FIG. 7 to show how the peak stress varies as both a function of radial position and hole size. It will be seen that it is possible to draw an envelope 72 through the minimum stress value for each curve and this envelope represents the minimum stress achievable for any given hole position. The lowest point on the envelope represents the minimum stress achievable for any hole size and position and represents an important new design parameter which hitherto has not been available to designers of this type of rotor.

Figure 7:
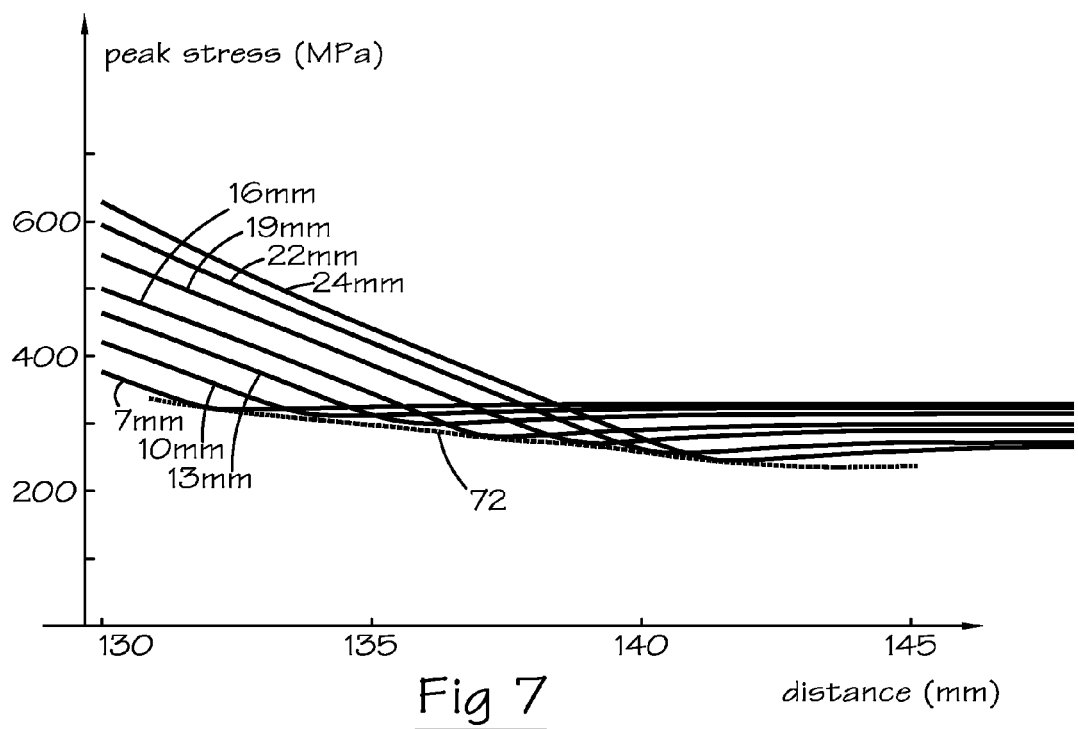
FIG. 7 shows curves of peak stress for a range of hole sizes and positions.

While all the information in FIG. 7 has been presented for the sake of a detailed explanation, in practice it would not be necessary to calculate all of these curves. Knowing the general shape of the curves and the envelope 72, an optimisation method can be adopted so that, from a given starting point, the method will find the minimum value of peak stress required. This will be demonstrated below.

While it has been shown that the peak stress in the lamination can be reduced by removing material from a particular place in the rotor pole as a result of providing one or more holes, the designer is concerned with other characteristics of the lamination design, in addition to peak stress. Since the rotor pole carries the main working flux of the machine, the cross section of it presented to the flux determines the flux density, which in turn determines the excitation required and the iron losses associated with the flux. Clearly, there is little net benefit to the machine if the peak stress is reduced to very low levels but the consequent penalty in increased flux density degrades the overall performance of the machine.

Various quantities could be used as a measure of the overall performance but one useful measure is the average torque developed over half a rotor pole pitch while the excitation current is maintained at a constant value. The typical shape of a torque curve is shown and discussed in the Miller and Stephenson references cited above. A point on this curve is often referred to as the "static" torque of the machine since it is the torque developed when the rotor is locked in some position and the excitation applied. The average value is taken over half a rotor pole pitch because this is representative of the torque developed in a chosen direction. The value of excitation current chosen is not critical, but is best chosen to be at or near the highest value of phase current encountered during normal machine operation, since this will show up the differences in the designs more clearly.

Figure 1:
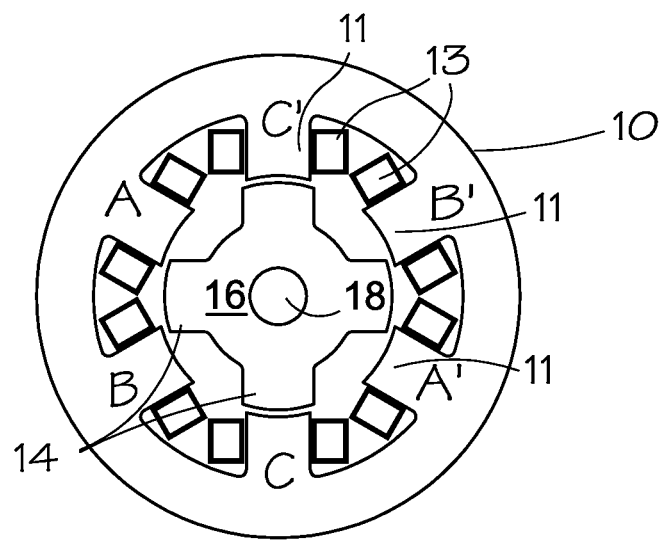
FIG. 1 shows typical rotor and stator laminations for a switched reluctance machine.
Figure 2:
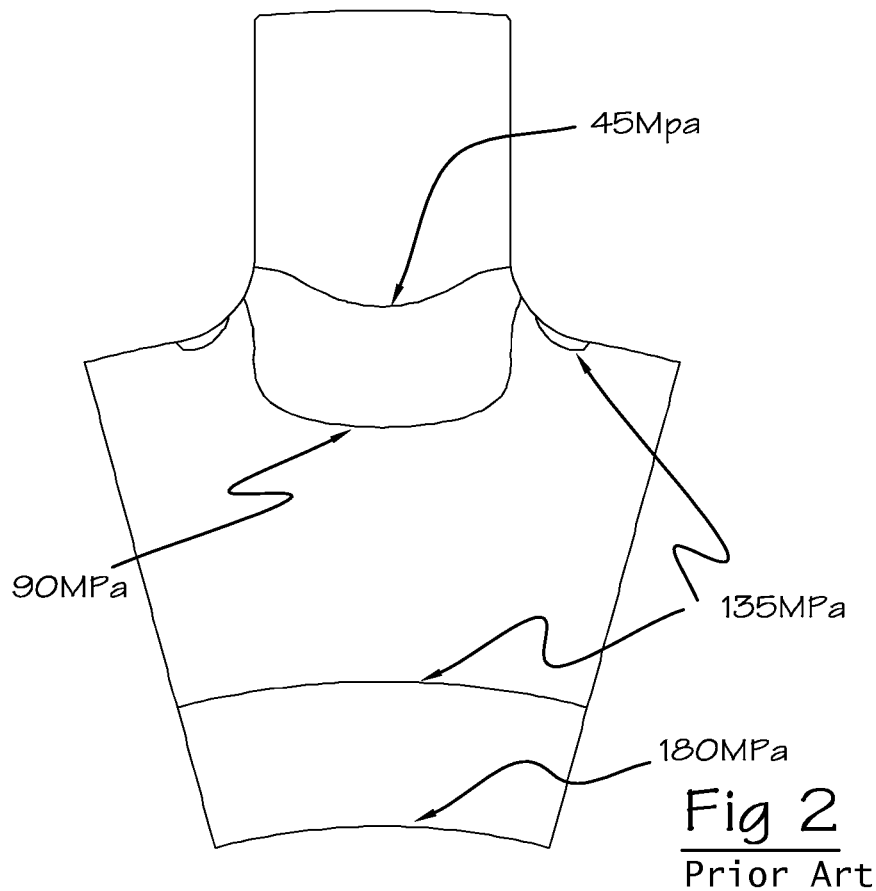
FIG. 2 shows the results of a stress analysis for a prior art rotor lamination having 8 rotor poles, the numeric values indicating stress contours in MPa at 10,000 rev/min.

If the dimensions of the stator and rotor laminations are known, then a finite element analysis can be used to evaluate the static torque at any rotor position, for example for machine as shown in FIG. 1. A mesh of triangular elements representing the laminations, the exciting coils and the surrounding air is set up and the flux paths are then found for a given excitation using methods well-known to those skilled in electromagnetic analysis. There are several methods of using the flux pattern to give the torque and it has been found that the Maxwell Stress analysis is particularly useful for the lamination shapes typically found in switched reluctance machines because it gives good convergence even when the airgap between the pole faces is small. This analysis allows the torque at one rotor position to be found. By successively moving the rotor a small amount and running the analysis again, the torque at each point over the half pole pitch can be defined. It is then a simple matter to calculate the average value, which relates closely to the starting performance of the machine and also gives a good measure of performance under single-pulse operation at higher speeds.

Figure 8:
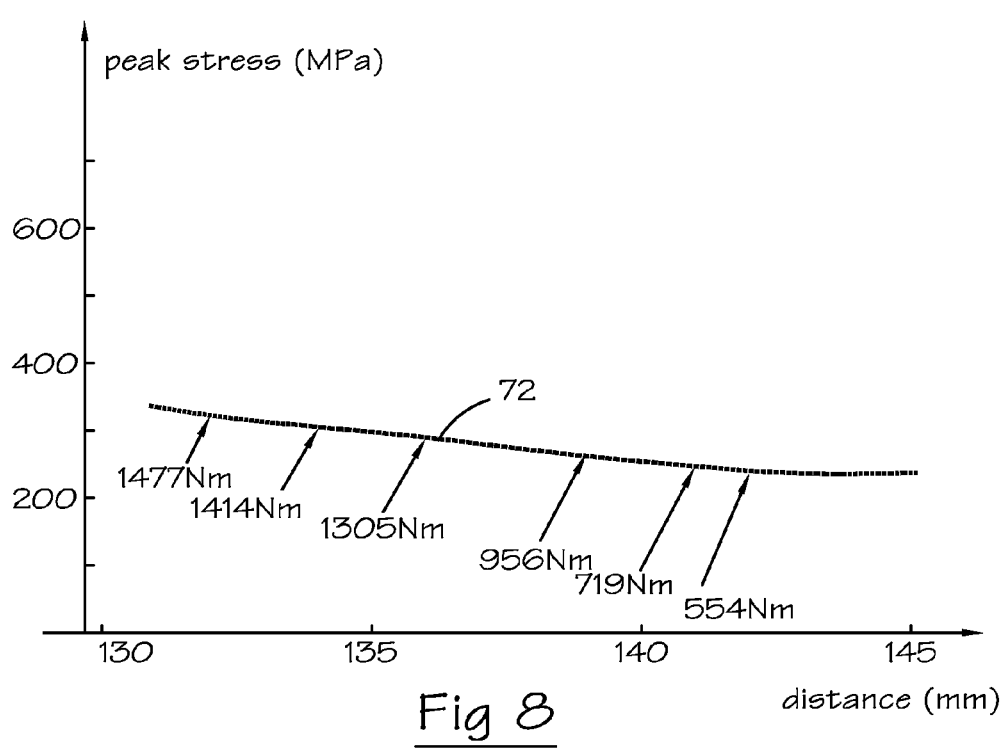
FIG. 8 shows an envelope of the curves of FIG. 7 and average static torque values in Nm.

FIG. 8 shows the result of such an evaluation, where the average static torque over half an electrical pole pitch for a chosen excitation current of 1000 A is marked on the envelope of FIG. 7 for the positions at which each of the curves of FIG. 7 reached a minimum (e.g., average static torques of approximately 554 Nm, 719 Nm, 956 Nm, 1305 Nm, 1414 Nm, and 1477 Nm). For comparison, the average static torque for the case with no hole is 1505 Nm. It is seen that as the hole diameter increases (i.e. the envelope is traversed from left to right) the torque output of the machine falls. Knowing this relationship, it is now possible to find the hole size and hole position which, for a required average torque, gives the minimum stress in the lamination.

Figure 9:
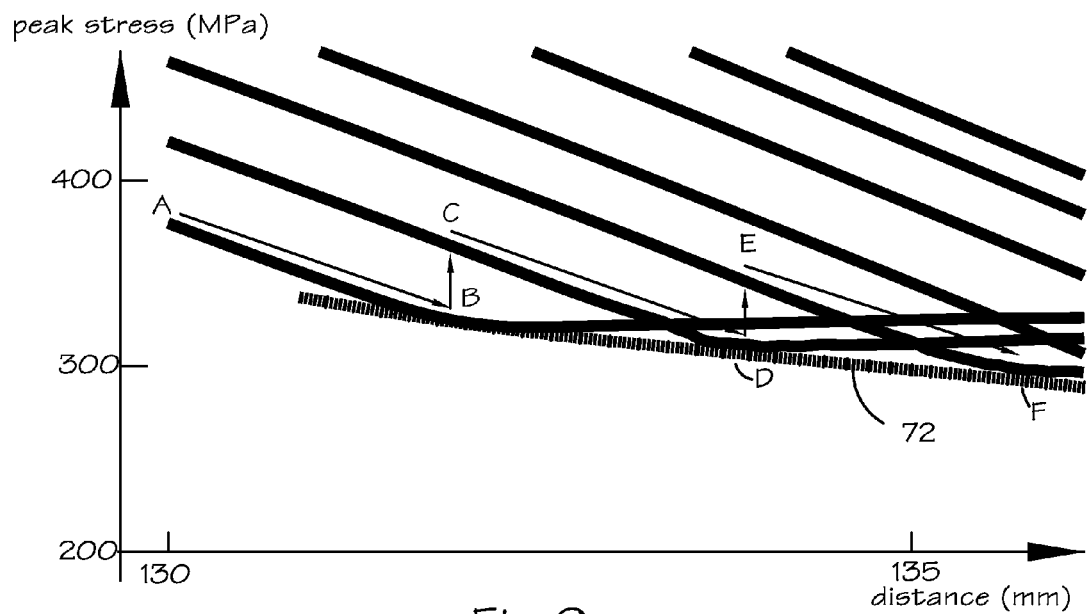
FIG. 9 shows an exemplary optimisation path along the curves of FIG. 7.

While this result can be obtained by inspection of FIGS. 7 & 8, it requires solution of the stress and torque output at many points. This may be laborious and time-consuming. It is possible to employ an optimisation scheme to perform this task, and those skilled in the art of optimisation routines will recognise that many different approaches could be used, e.g., Monte Carlo, hill-climbing, etc. A bespoke method is illustrated in FIG. 9, where an enlarged view of part of FIG. 7 is shown. From a chosen starting point, Point A, with a small hole size and a position relatively close to the lamination centre, the stress is calculated for a series of positions of the hole moving away from the centre of the lamination (i.e., progressing downwards to the right from Point A). When the stress begins to rise, the minimum stress has been passed, so the average static torque at the previous position, point B can be calculated. Assuming this average static torque is above that required, the stress at Point C can be calculated for a slightly larger hole diameter and the routine progresses down the curve, by moving the hole radially outwards, to the minimum stress at Point D, where the average static torque can be calculated. If the average static torque is at or around the minimum acceptable, then Point D will represent the optimum design. If the average static torque is still above the required value, the routine can be repeated with a yet larger hole from Point E to Point F, and the resulting average static torque at Point F can be assessed. Those skilled in the art of optimising routines will recognise that the step lengths along and between the curves can be dynamically adjusted to reliably find the minimum points on the curves with a reduced number of calculated points.

Figure 10:
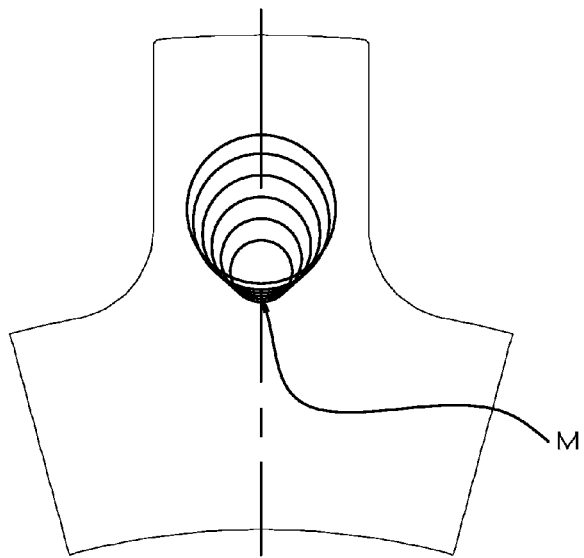
FIG. 10 shows a construction used in another optimisation routine.

A slightly different approach to determining the optimum size and position of the hole can be developed by noting that the circumferences of the holes which contribute to the shape of the envelope in FIG. 7 are almost co-incident on the centre line of the pole. This is illustrated in FIG. 10 where each hole diameter in FIG. 7 is shown in the position where it gives the lowest peak stress. The circumferences intersect the pole centre line in the close proximity of Point M. It follows that the position of Point M can be established closely by taking any hole size and simply varying the position from the lamination centre until a minimum peak stress is found. The diameter of the hole can then be varied while keeping the circumference on Point M and calculating the average torque. When the torque falls to the minimum acceptable value, the position and size of the hole is determined. This approach will not be quite as accurate as the first optimisation method described above, but may result in a reduced number of calculations and is simpler to code in a software routine.

The embodiments so far described use one circular hole in a pole body to achieve the design goals of minimising lamination stress, mass and inertia. However, the invention is not limited to the use of one hole or to the use of circular holes.

However, since multiple holes and/or non-circular holes need significantly more parameters to accurately describe their size and position, their use makes the design process more complex. One way of dealing with this complexity is to determine key points on the boundaries of the holes before considering their actual shape. This will now be demonstrated by describing how the parameters of a non-circular hole (NCH) can be determined.

Figure 11:
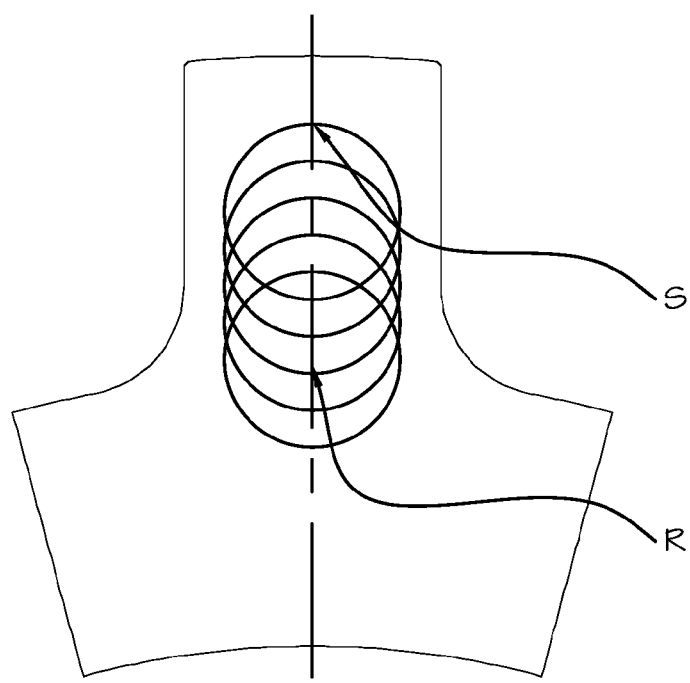
FIG. 11 shows a method for determining points on a boundary.

If a medium-sized circular hole is firstly chosen, say, one with a diameter between 50% and 75% of the pole width, then, as shown in FIG. 11, Point R can be established as described above by successively calculating the stress as the hole is moved outwards from the centre of the rotor and determining the minimum peak stress. Point R can be taken as the inner boundary of the NCH, since moving it inwards would increase the peak stress.

If now the circular hole centre is moved further outwards, the average torque can be calculated at each position and Point S determined as the point where the outermost part of the hole cuts the pole centre line when the torque begins to fall to any significant extent. Point S can be taken as the outermost boundary of the NCH, since moving it further outwards would degrade the output of the machine. It will be noted that the pole face is not broken by point S.

Figure 12:
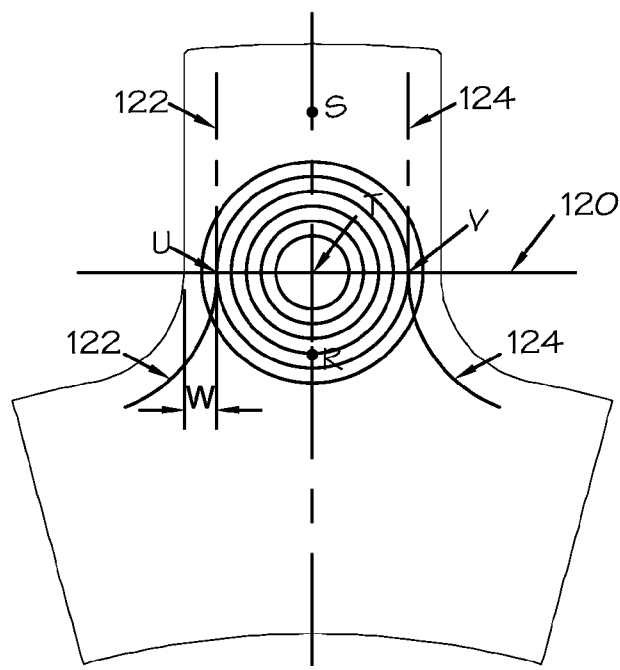
FIG. 12 shows a method of constructing loci to determine further points on a boundary.

Now consider FIG. 12, where a line 120 has been chosen to be normal to the pole centre line and to be where the fillet radius of the outer profile ends and the parallel-sided pole portion begins. Point T is where this line intersects the pole centre line. A series of concentric circles can now be constructed using Point T as their centre. For each hole diameter, the average static torque can be calculated and compared to the acceptable minimum. When the average static torque reaches the acceptable minimum, the intersections of the hole circumference with line 120, i.e., Point U and Point V, are taken as points the distance of which, from the outer lamination profile defines the width W which represents the minimum width which should be used for the part of the lamination at the sides of the NCH. On each side of the pole, a locus 122, 124 which is offset from the outer profile by the width W can be drawn. The side boundaries of the NCH can be considered to be on these loci. Note that the boundaries of the NCH lie entirely within the outer profile of the pole.

In the figures, large increments have been taken in hole sizes to illustrate how to establish Points R, S, U & V. This is purely for clarity in illustration, since in practice a smaller increment would be used so as to locate the points more precisely. Those skilled in the art will be familiar with the use of dynamic step lengths so as to use a large step when far from the target and successively smaller steps when approaching the target.

Figure 13:
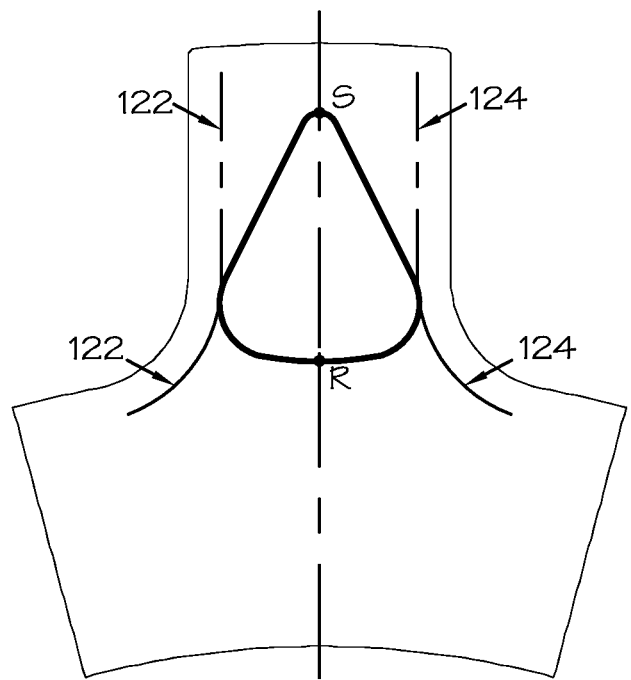
FIG. 13 shows an exemplary non-circular hole (NCH) in the salient pole.

The shape of the NCH can now be chosen, taking into account Point R, Point S and the loci 122, 124. While a wide variety of shapes could be conjectured, some other considerations should be kept in mind. For example, at Point R it is preferable to use as flat a boundary as possible, so as to avoid any unnecessary rise in stress. At Point S, a sharp internal corner would not be easy to manufacture, so a radius would be chosen. At the side boundaries, the length of the part of width W should be kept relatively short, so as to minimise the increase in magneto motive force (mmf) required to support the flux in the lamination. The boundary of the NCH should preferably be smooth (finite rate of change of the tangential direction along all of the boundary) so as to avoid creating new peak stress regions at sharp corners. A shape which takes account of these guidelines is shown in FIG. 13. The resulting shape of the hole (and hence inner contour of the salient pole) approximates a triangle with radiussed or rounded corners.

The inner contour defining the hole has a base extending across the rotor pole in the region of the root portion and two sides extending radially outward and towards each other. In some embodiments, the base and sides are joined by rounded portions for the reasons described above. In some embodiments, the resulting shape is smooth, for example the rate of change of the tangential direction of the inner contour being finite along the inner contour.

The sides of the shape, and in particular the outwardly extending sides need not be straight but, in some embodiments, may be curved or radiussed, for example the two outwardly extending sides, in some embodiments, join the rounded corners by concave arches.

Figure 14:
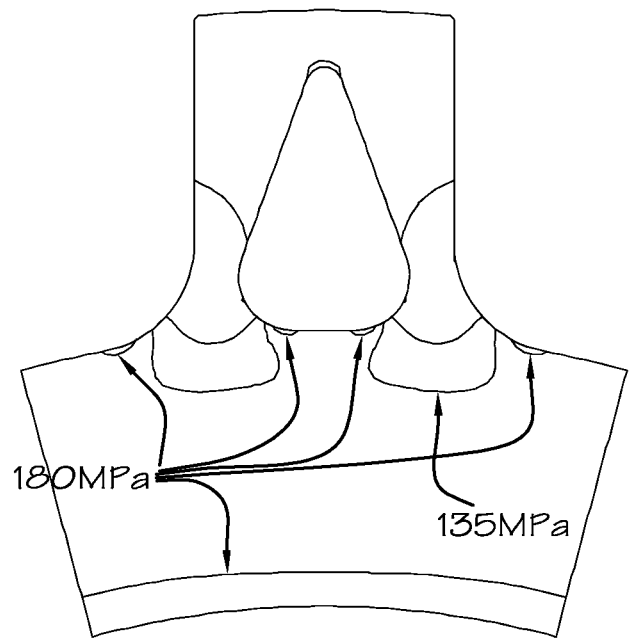
FIG. 14 shows the results of a stress analysis for the rotor lamination of FIG. 13, the numeric values indicating stress contours in MPa at 10,000 rev/min.

The stress analysis for this shape is shown in FIG. 14. Examination of the stress contours (e.g., the contours in FIG. 14 along which the stress at 10,000 rev/min is approximately equal to 135 MPa and 180 MPa) shows that the peak stress is now balanced at the root of the pole, the corner of the NCH and the bore area of the lamination. This shows that the lamination is well-balanced in terms of stress, with no one area being responsible for a limit. It should also be noted that the peak stress is reduced below that achieved with a single, circular hole, due to the flatter profile of the bottom of the hole not acting as a stress raiser.

Figure 15:
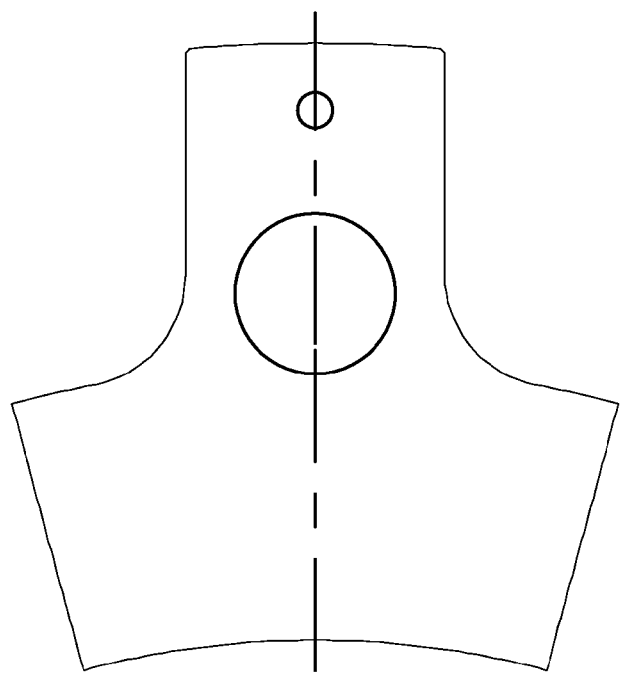
FIG. 15 shows a combination of two circular holes to approximate the hole of FIG. 13.
Figure 16:
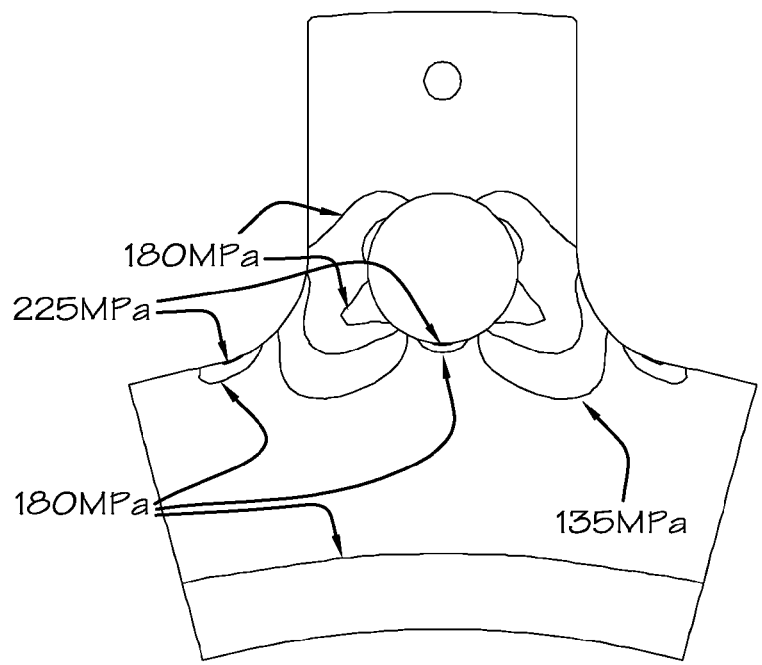
FIG. 16 shows the results of a stress analysis for the rotor lamination of FIG. 15, the numeric values indicating stress contours in MPa at 10,000 rev/min.

It might be expected that the effect of the NCH in FIG. 13 could be approximated by using two or more circular holes, which would be preferred for the simplicity they could bring to the design and construction of the lamination tooling. Such an approximation is shown in FIG. 15. However, the stress analysis for this arrangement, shown in FIG. 16, indicates that the presence of the small hole does not alter the stress contours in any material way, so the stress is controlled by the size and placement of the larger hole (see, e.g., the contours in FIG. 16 along which the stress at 10,000 rev/min is approximately equal to 135 MPa, 180 MPa, and 225 MPa). It is concluded that the shape shown in FIG. 13 may be close to providing optimum peak stress reduction without significantly affecting peak torque.

In all the embodiments of the invention, neither the outer profile of the rotor nor the (inner) profile or contour of the cut-out for the shaft is affected by the presence of the hole or holes introduced by the invention. The material removed is taken entirely from the interior of the rotor between the outer and inner profiles and the hole(s) thus formed have closed contours.

The skilled person will appreciate that variation of the disclosed arrangements, particularly with respect to the illustrative hole sizes and positions, is possible without departing from the scope of the claims. Accordingly, the above description of several embodiments is made by way of example and not for the purposes of limitation. It will be clear to the skilled person that minor modifications can be made to the arrangements without significant changes to the benefits and operation described above. The scope of protection claimed is intended to be limited only by the following claims.

The invention claimed is:

1. A rotor for a switched reluctance machine, the rotor comprising:
   a core portion that defines an axis of rotation for the rotor;
   a plurality of salient poles that project outwardly from the core portion;
   wherein each salient pole has:
      a hole defined by a smooth closed contour; and
      fillet radii on opposing sides of the salient pole that smoothly connect the salient pole to the core portion;
   wherein a radially outermost point of the smooth closed contour is on a rounded portion of the smooth closed contour on the center line of the respective pole, the hole being arranged to reduce peak stress in the rotor by reducing stress due to centrifugal forces when the rotor is rotating about the axis; and wherein the rotor includes no magnetisable material within the smooth closed contours.

2. A rotor as claimed in claim 1,
wherein the smooth closed contour has a base at a radially innermost portion of the smooth closed contour, the base extending across the respective pole and centrally offset by a substantially same width from two opposing sides of an outer profile of the respective pole;

wherein the smooth closed contour includes two sides extending outwardly from the base towards each other and joined at the radially outermost point of the smooth closed contour; and wherein the base and the two sides are joined to each other by rounded portions of the contour.

3. A rotor as claimed in claim 2,
wherein the base is substantially flat;
wherein the two outwardly extending sides are substantially straight; and
wherein the smooth closed contour has a triangular shape with rounded corners.

4. A rotor as claimed in claim 1, wherein the smooth closed contour has a circular shape.

5. A rotor as claimed in claim 1, wherein the smooth closed contour comprises no sharp corners.

6. A rotor as claimed in claim 1,
wherein the smooth closed contour of each hole is disposed interior to a pair of loci that run along opposing sides of an outer profile of the respective pole at a minimum distance from the outer profile; and
wherein the minimum distance has been determined in a peak stress reduction optimization process.

7. A rotor as claimed in claim 1, further comprising a stack of laminations forming the rotor.

8. A rotor as claimed in claim 1, wherein there is a single hole for each pole.

9. A rotor as claimed in claim 1, wherein the rotor carries no windings or magnets.

10. A rotor lamination for stacking to make a rotor as claimed in claim 1.

11. A switched reluctance machine comprising a stator and a rotor as claimed in claim 1 arranged to rotate within the stator.

12. A switched reluctance machine as claimed in claim 11, wherein a reduction in a measure of torque output of the switched reluctance machine due to the absence of magnetisable material within the smooth closed contours of the holes does not exceed 10% of the torque output without the holes.

13. A switched reluctance machine as claimed in claim 11, wherein the rotor carries no windings or magnets.

14. A method of manufacturing a rotor for a switched reluctance machine or laminations for stacking into a rotor for a switched reluctance machine, the rotor having an outer profile defining a plurality of salient poles projecting outwardly from a core portion defining an axis of rotation, the method comprising:
determining a radial position, a size, and/or a shape of one or more holes to be formed in one or more of the salient poles in a peak stress reduction optimization process to reduce peak stress in the rotor by reducing stress due to centrifugal forces when the rotor is rotating about the axis, wherein the determining comprises determining a radially outermost point of each hole to be on a rounded portion of the hole on the center line of the respective salient pole; and
making the one or more holes having the determined radial position, size, and/or shape in the one or more of the salient poles, the one or more holes having no magnetisable material within.

15. A method as claimed in claim 14, wherein the determining comprises determining the radial position of each hole to reduce peak stress by reducing stress due to centrifugal forces subject to a minimum acceptable value specified for a measure of output of the switched reluctance machine.

16. A method as claimed in claim 14, wherein the determining comprises determining the size of each hole to reduce peak stress by reducing stress due to centrifugal forces subject to a minimum acceptable value specified for a measure of output of the switched reluctance machine.

17. A method as claimed in claim 14, wherein the determining comprises determining the shape of each hole to reduce peak stress by reducing stress due to centrifugal forces subject to a minimum acceptable value specified for a measure of output of the switched reluctance machine.

18. A method as claimed in claim 14, wherein the determining comprises determining the radial position and the size of each hole to reduce peak stress by reducing stress due to centrifugal forces subject to a minimum acceptable value specified for a measure of output of the switched reluctance machine.

19. A method as claimed in claim 14, wherein the determining comprises determining the radial position and the shape of each hole to reduce peak stress by reducing stress due to centrifugal forces subject to a minimum acceptable value specified for a measure of output of the switched reluctance machine.

20. A method as claimed in claim 14, wherein the determining comprises comprising determining the radial position, the size, and the shape of each hole to reduce peak stress by reducing stress due to centrifugal forces subject to a minimum acceptable value specified for a measure of output of the switched reluctance machine.

21. A method as claimed in claim 20, wherein the measure of output of the switched reluctance machine comprises an average static torque of the switched reluctance machine, and wherein the determining of the radial position, the size, and the shape of each hole in each pole comprises:
determining an innermost radial position for the hole on the pole that produces a local minimum for the peak stress;
determining an outermost radial position for the hole on the pole beyond which the average static torque of the switched reluctance machine begins to fall below the minimum acceptable value;
determining first and second loci of minimum distance from the outer profile of the pole to the hole subject to the minimum acceptable value specified for the average static torque; and
determining the radial position, the size, and the shape of the hole so that the hole is formed in the pole within the innermost radial position, the outermost radial position, and the loci.

* * * * *